United States Patent [19]

Laky et al.

[11] 4,013,270
[45] Mar. 22, 1977

[54] COMBINED WINCH AND BOOM ASSEMBLY

[75] Inventors: Elmer Laky, Cranford; Ralph Walsh, Oceanport, both of N.J.

[73] Assignee: Breeze Corporations, Inc., Union, N.J.

[22] Filed: Mar. 29, 1976

[21] Appl. No.: 671,548

[52] U.S. Cl. .................... 254/173 R; 254/186 R; 254/193

[51] Int. Cl.² ................................. B66D 1/48

[58] Field of Search .......... 254/173 R, 139, 186 R, 254/190 R, 192, 193, 194, 195, 196, 197, 134.3 R; 74/519

[56] References Cited

UNITED STATES PATENTS

| | | | |
|---|---|---|---|
| 1,657,187 | 1/1928 | Whittlesey | 254/139 X |
| 2,654,571 | 10/1953 | Albright, Jr. | 254/194 |
| 2,802,639 | 8/1957 | Troyer | 254/190 R |
| 2,931,331 | 4/1960 | Uebelhoer | 254/139 X |
| 3,215,405 | 11/1965 | Walsh | 254/173 R X |
| 3,715,103 | 2/1973 | Carreras | 254/186 R X |
| 3,744,759 | 7/1973 | Jennings | 254/173 R X |
| 3,788,607 | 1/1974 | Crooks | 254/186 R |
| 3,836,120 | 9/1974 | Niskin | 254/190 R X |

Primary Examiner—Frank E. Werner
Assistant Examiner—Donald W. Underwood
Attorney, Agent, or Firm—Albert F. Kronman

[57] ABSTRACT

A rigid boom is provided with a cable receiving winch drum and a traction sheave to receive the cable therethrough. The drum is laterally removable from the boom and a latch and split cable guide mechanism on the sheave permits a new drum and cable to be installed on the boom in a short interval of time.

8 Claims, 6 Drawing Figures

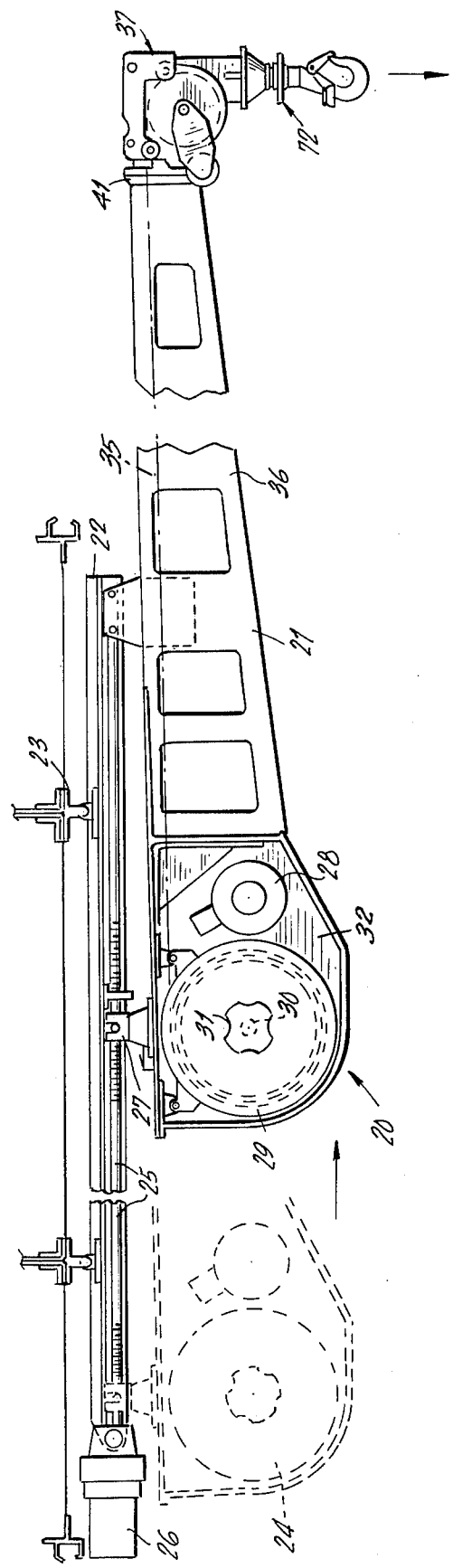
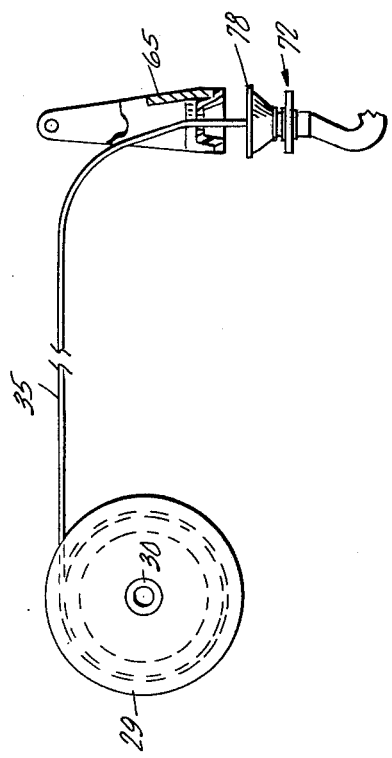

COMBINED WINCH AND BOOM ASSEMBLY

BACKGROUND

Winches, particularly those used for helicopter rescue operations, frequently encounter conditions where the lifting and hovering cable either parts or must be cut to save the aircraft. Where the winch is part of a boom assembly, the cable is run from the winch drum, along the boom and through a traction sheave. The end of the cable terminates in a hook or other fastening or load engaging device. Replacing a severed cable in such assemblies is a time consuming operation which often necessitates the return of the helicopter to its base.

In the present invention it is possible to replace a severed cable while in flight and with a minimum loss of operational flight time.

Accordingly, it is an object of the present invention to provide a winch and boom assembly which lends itself to ready, in-flight, repair.

Another object of the present invention is to provide a winch and boom assembly in which the cable can be removed and a new cable substituted, employing a few simple tools and by relatively unskilled personnel.

A further object of the present invention is to lengthen the time a helicopter may conduct a rescue or other mission in spite of winch cable failure.

A feature of the present invention is its novel winch and boom construction which enables the boom cable drum to be removed from the winch by the disengagement of a single knob.

Another feature of the present invention is its novel traction sheave construction which permits the free end of a new cable to be threaded therethrough without disassembly of the sheave.

Still another feature of the present invention is its novel sheave mounting arrangement which permits free movement of the cable guide through 360° to prevent cable wear.

SUMMARY

In one embodiment of the present invention, an elongated boom, capable of being extended outward of an aircraft is provided with a winch consisting of a source of rotary power and a cable receiving drum. The drum is mounted at the inboard end of the boom and a traction sheave which controls the travel of the cable is secured to the outboard end of the boom. A latch-like member overlies the cable within the sheave and a cable guide having a lateral slot therein enables a replacement cable to be slipped within the sheave without sheave disassembly. Drum and cable may be removed from the boom by removing a single knob readily accessible from within the aircraft.

BRIEF DESCRIPTION OF THE DRAWINGS

In the accompanying drawings forming part hereof, similar parts have been given identical reference numbers, in which drawings:

FIG. 1 is a view in side elevation of a complete embodiment of the present invention.

FIG. 2 is a view in side elevation, partly broken away, of the drum and cable guide according to the present invention.

GENERAL DESCRIPTION

Figure 3:
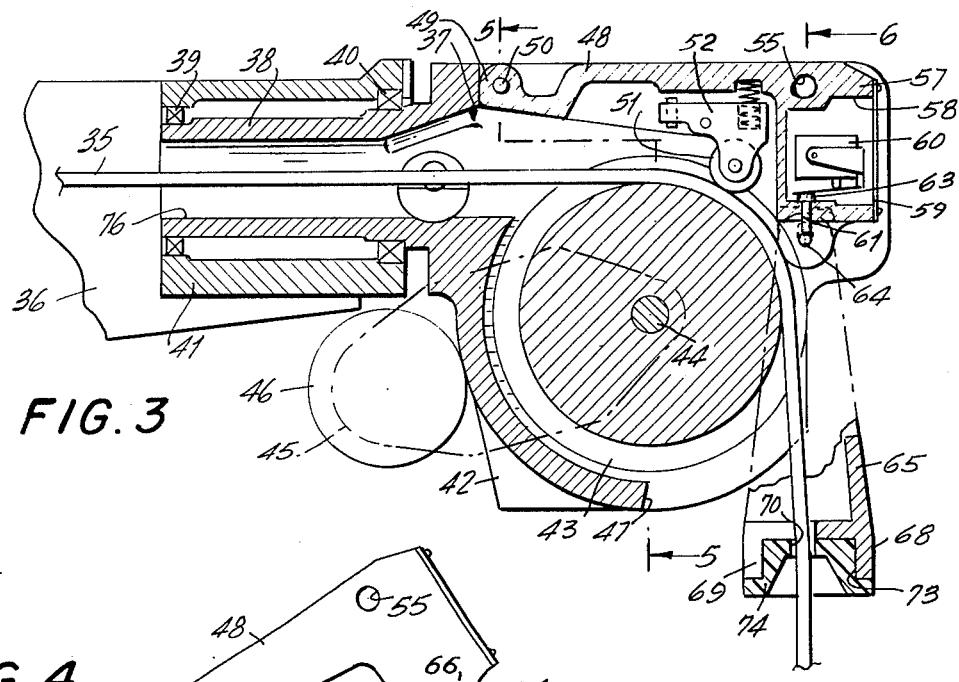
FIG. 3 is a view in vertical cross section, somewhat enlarged, of the traction sheave and cable guide shown in FIG. 1.

Referring to the drawings and particularly to FIG. 1, there is shown a winch and boom assembly, 20 such as is suited for helicopter use. The boom 21 is secured to a track 22 which in turn is fastened to the structure of the aircraft (not shown) by means of brackets 23. The boom which may be formed of elongated triangularly disposed plates 36 is longitudinally slidable upon the track 22 from the inboard position indicated by dashed lins 24 in FIG. 1 to the outboard position shown in full lines. Traverse of the boom 21 is accomplished by an elongated, threaded shaft 25, a drive motor 26 attached to the inboard end of the shaft and a nut 27 threaded upon the shaft and coupled to the boom.

The winch portion of the assembly includes a winch motor 28 which drives a cable drum 29 through a gear train and clutches. The gear train and clutches are well-known in the winch art, form no part of the present invention, and need not be further described herein.

The cable receiving drum 29 is keyed to the output shaft 30 of the winch gear train and is secured in place by means of an internally threaded knob 31. The output shaft 30 is externally threaded to receive the knob 31. Since the output shaft 30 extends laterally through the winch housing 32, the drum 29 may be disposed on the outside of the winch housing. As a result, the entire drum 29 and any cable which may be wound upon it may be quickly removed from or placed upon the shaft 30 merely by removing the knob 31 and sliding the drum off or on the said shaft. The drum is positively and operatively secured to the shaft 30 when the knob is returned to the position shown in FIG. 1.

The winch cable 35 is led from the drum 29, between the plates 36 of the boom 21 to a power or traction sheave 37 carried at the outboard end of the boom 21. The traction sheave 37 controls the travel of the cable 35, as it is payed out or rewound upon the winch drum 29 during winch operations, to prevent accidental displacement of the turns of cable upon the drum. The function and operation of traction sheaves is well-known and is fully set forth in U.S. Pat. No. 3,290,013.

Referring to FIGS. 3–6 it will be seen that the traction sheave 37 is journaled upon the end of the boom 21 by means of a stub shaft 38 freely carried within spaced bearings 39, 40. The bearings 39, 40 are retained within a bearing block 41 fastened to the boom plates 36. Because of this mounting, the traction sheave 37 is free to rotate through any arc about the longitudinal axis of the boom 21 in response to lateral motion of a load upon the end of the cable.

Figure 5:
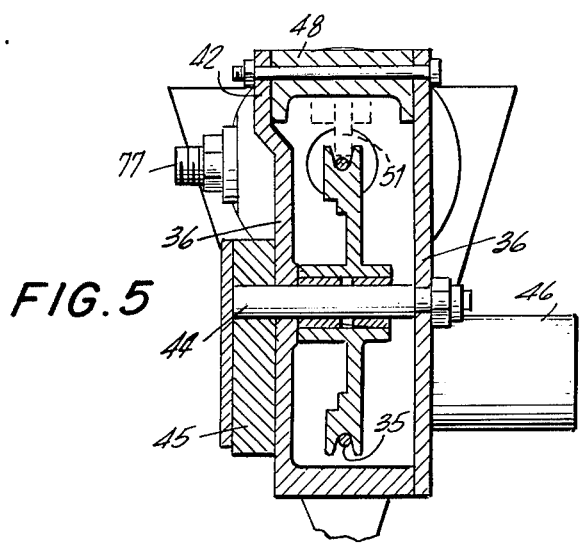
FIG. 5 is a sectional view taken on line 5—5 in FIG. 3 looking in the direction of the arrows.
Figure 6:
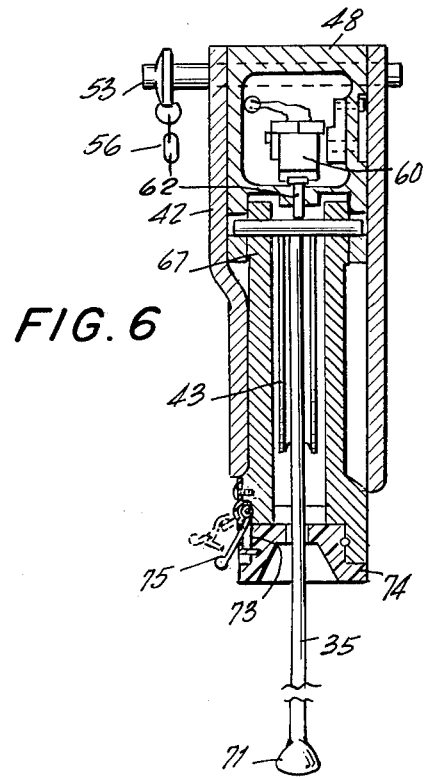
FIG. 6 is a sectional view taken on line 6—6 in FIG. 3 looking in the direction of the arrows.

The traction sheave 37 has an outer box-like hollow housing 42, best shown in FIGS. 5 and 6. The traction pulley 43 is mounted upon a shaft 44 coupled by means of a gear train 45 to a motor 46. The front of the housing 42 is cut away as indicated at 47 in FIG. 3 to permit the cable 35 to pass therethrough as it leaves the pulley 43.

A latch plate 48 is swingably secured at its inner end 49 to the traction sheave housing 42 by a tranverse shaft 50. The latch plate may thus be swung from the position shown in FIG. 5 where it is close adjacent the pulley 43 to that shown in FIG. 4 where it is displaced from the said pulley. In the position shown in FIG. 3 (hereinafter the closed position) a small pressure roller 51 carried in a spring loaded support 52 held by the frame 42 is brought to bear upon the surface of the cable 35. The pressure roller 51 urges the cable 35 into good frictional contact with the traction pulley 43. When the latch plate 48 is in the position shown in FIG. 4 (hereinafter the open position) the pressure roller 51 is swung away from the cable 35 with the said latch plate. A pin 53 (see FIG. 6) is thrust through boxes 54, 55 in the housing 42 and latch plate 48 to secure the said plate in the closed position. The pin 53 is held captive to the housing 42 by a small chain 56 to prevent loss when the latch plate is opened after removal of the pin.

The front of the latch plate 48 has a thickened downwardly extending portion indicated at 57 having a small chamber 58 therein. A plate 59 covers the front of the chamber to enclose a limit switch 60 carried within the said chamber. The limit switch is responsive to a plunger 61, shown in FIG. 3, which is freely carried within a vertical bore 62 in the bottom of the chamber 58.

The plunger 61 is provided with an enlarged head portion 63 which limits its downward movement. The bottom of the plunger 61 rides upon a small axle 64 which freely supports a cable pendant or guide 65. The axle 64 is carried at each end in elongated bores 66 (see FIG. 4) provided in the latching plate housing 42, while the pendant 65 is forked at its upper end 67 and bored to receive the axle 64 therethrough.

The lower end 68 of the pendant 65 is provided with a keyhole slot 69 so that the cable 35 may be moved into the central opening 70 of the keyhole slot 69 without having to thread the cable through the said opening. This feature is necessary for the quick replacement of cables since cables of the type used herein are formed with a swaged ball 71 (see FIG. 6) at the free end thereof by means of which the hook assembly 72 is secured to the said cable. A recess 73 in the free end of the pendant 65 receives a split anti friction bushing 74 through which the cable passes. The bushing 74 may be made of Nylon, Teflon, high density poly ethelene or some other suitable material which will resist wear.

Figure 4:
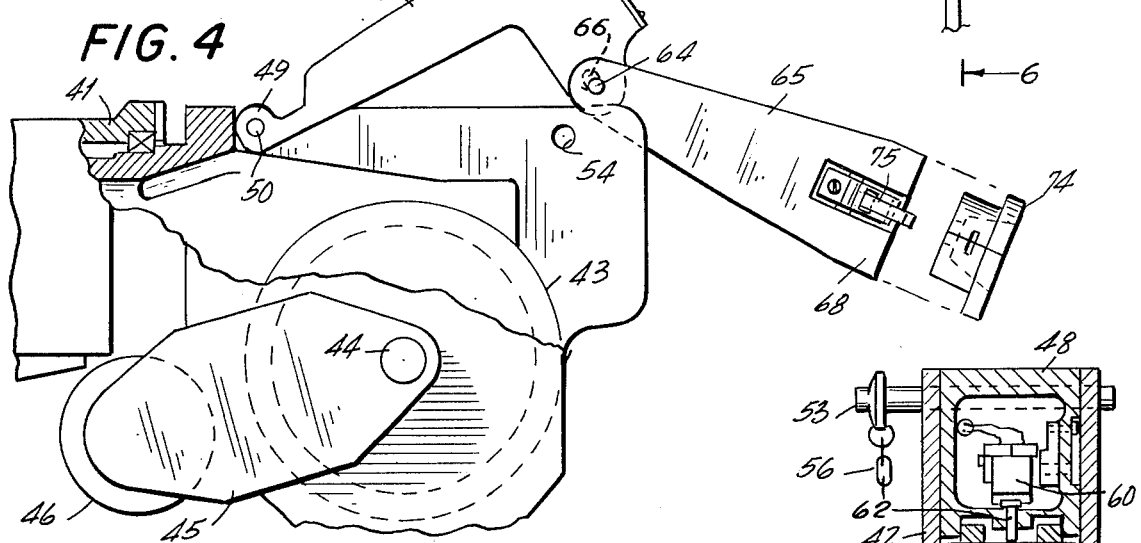
FIG. 4 is a view in side elevation of the traction sheave in the unlatched or cable receiving position.

The bushing 74 is slipped around the cable 35 pushed into the recess 73 and held in place by the snap latch 75 (see FIG. 4). It will be apparent that the pendant is free to swing in an arc about the longitudinal axis of the axle 64 in response to swinging movement of a load on the cable 35. This pendant motion together with the swinging motion of the traction sheave permits the cable to swing through a 360° circle with minimum wear on the bushing 74.

In the event of cable failure or if the cable must be cut by the cable cutter 77 indicated in FIG. 5, the winch and boom assembly can be placed back in operation by winding the remaining cable back on the drum, removing the drum and replacing the drum and cable as set forth above.

As shown in FIG. 2, the upper portion of the hook assembly 72 is provided with a resilient bumper 78. If the winch motor is not stopped in time as the hook assembly is raised, the bumper 78 will strike the bottom of the pendant 65 moving it upwardly. The upward motion of the pendant causes the axle 64 to lift the plunger 61 within the elongated bores 66 thereby opening the normally closed limit switch 60 to stop the winch motor.

From the foregoing the operation of the above assembly will be understood to be as follows:

When it is desired to place a cable in the winch and boom assembly the knob 31 is run off the output shaft 30 and a drum 29 having a cable 35 therein slipped upon the said shaft. The knob 31 is then replaced upon the output shaft. The free end of the cable 35 is then pulled along the boom 21 between the plates 36 and fed through the central bore 76 of the stub shaft 38 on the traction sheave 37. With the pin 53 removed and the latch plate 48 swung into the open position, the cable is next lead over the traction pulley 43, and down through the pendant, using the keyhole slot. The latch plate 48 is next swung closed and secured by the pin 53. The split bushing is placed around the cable and secured within the pendant recess 73. The cable is then ready to receive the hook assembly and the winch placed in operation.

In the event of cable failure or if the cable must be cut by the cable cutter 77 indicated in FIG. 5, the winch and boom assembly can be placed back in operation by winding the remaining cable back on the drum, removing the drum and replacing the drum and cable as set forth above.

Having thus fully described the invention, we claim:

1. A combined winch and boom assembly comprising an elongated boom member, an inboard end and an outboard end on said boom, a winch secured to the boom adjacent its inboard end, a cable receiving drum for said winch laterally disposed with respect to the boom, a source of rotary power for said drum, an output shaft connected to the source of rotary power and extending outwardly of said boom, lateral fastening means to couple the drum to the extended portion of the output shaft, a cable for the said drum, a traction sheave carried by the outboard end of the boom to receive the cable therethrough, a traction pulley in said sheave, a latch plate on said traction sheave swingably carried by said traction sheave above said pulley and a cable pendant swingably carried by the latch plate to receive and guide the cable passing through the traction sheave.

2. A device according to claim 1 in which the output shaft is externally threaded and the drum coupling means comprises an internally threaded member receivable on said shaft threads.

3. A device according to claim 1 in which the outboard end of the boom is provided with a bearing block and the traction sheave a stub shaft journaled within the said bearing block.

4. A device according to claim 1 in which the traction sheave includes a limit switch carried by the latch plate, and a plunger responsive to upward movement of the pendant to operate said limit switch.

5. A device according to claim 4 in which the pendant is freely carried upon an axle disposed within spaced elongated bores in the latch plate.

6. A device according to claim 1 in which the pendant is bifurcated at its latch plate engaging end and provided with a keyhole slot at its opposite end to receive the cable therethrough.

7. A device according to claim 2 in which the internally threaded member is a knob and the traction sheave includes a source of rotary power coupled to the traction pulley.

8. A device according to claim 6 in which the pendant is provided with a recess adjacent the keyhole slot and a split centrally bored friction bushing received within said recess.

* * * * *